Jan. 15, 1935.  L. H. HOUNSFIELD  1,988,009
TESTING INSTRUMENT FOR MEASURING THE MECHANICAL
PROPERTIES OF STEEL AND OTHER MATERIALS
Filed Oct. 21, 1931

Inventor:
Leslie Haywood Hounsfield,
By Byrnes, Stebbins, Parmelee & Bleuler
attys.

Patented Jan. 15, 1935

1,988,009

UNITED STATES PATENT OFFICE 1,988,009

TESTING INSTRUMENT FOR MEASURING THE MECHANICAL PROPERTIES OF STEEL AND OTHER MATERIALS

Leslie Haywood Hounsfield, London, England

Application October 21, 1931, Serial No. 570,241
In Great Britain December 3, 1930

2 Claims. (Cl. 33—172)

This invention relates to testing instruments for measuring the maximum tensile stress, yield point and other "mechanical properties" of materials of construction wherein the test load is applied to a calibrated spring and wherein the deflection used for determining the load is indicated by means of a mercury gauge operating substantially at atmospheric pressure and without damping action.

It has for one of its objects the provision of means for readily ridding the gauge system from air should it become entrained in the system.

Figure 1:
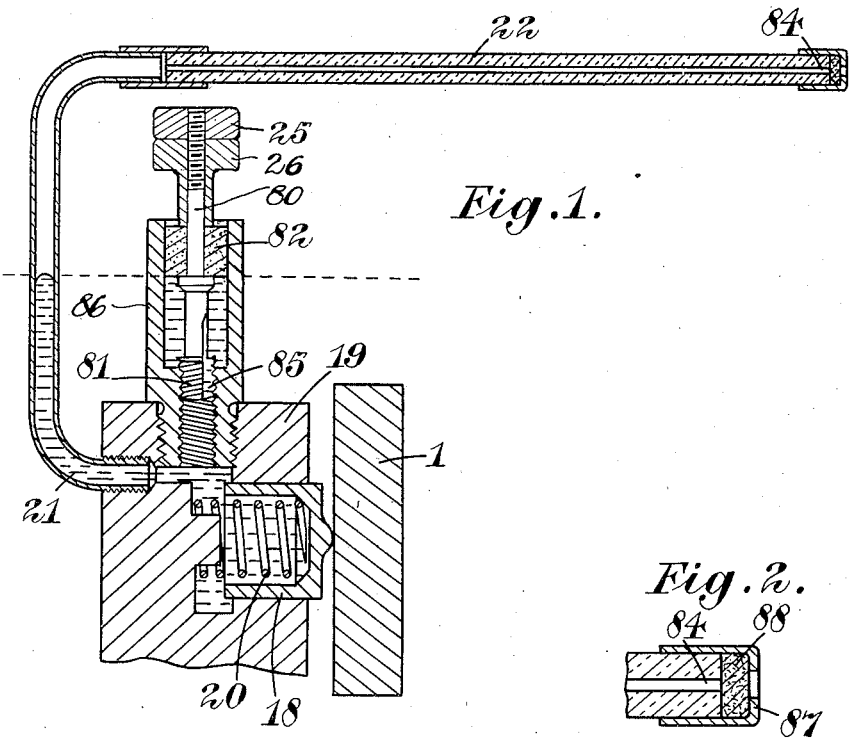
Figure 2:
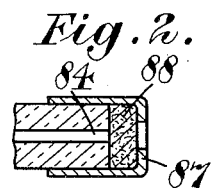

In the accompanying drawing,

Figure 1 is a diagrammatic representation in section of an improved mercury gauge system according to the present invention, and Figure 2 is an enlarged view of the "open" end of the system.

In Figure 1, 1 represents in cross-section a spring beam which flexes in a horizontal direction and the deflection of which is used to measure the load applied. A rigid post 19 fixed to the base of the instrument is provided with a cylindrical hole fitted with a piston 18, the head of which is kept in contact with the spring beam 1 by a helical spring 20.

Thus when the spring beam deflects under load the piston is pushed inwards and mercury thereby displaced passes through an outlet 21 and along the fine bore glass tube 22.

At the moment the specimen fractures the energy stored up in the spring 1 is released, thereby giving rise to severe vibration which results in violent fluctuations in the internal pressure of the gauge system, and may cause air to enter through passages too small for mercury to escape. It may enter for example past the outside of the piston 18, past a plunger 82 or past the mercury in the column 22.

In carrying out the invention, the plunger or piston 82 is made of felt or similar porous material so as to permit air to escape freely through the plunger while preventing egress of mercury. The plunger or piston 82 is secured by means of a knurled head 25, 26 to the rod 80 which is formed integral with the screw 81.

Bubbles of air inside the gauge system gravitate to the top and some air bubbles will pass towards the piston 82 and escape through the latter while others may pass to the outlet 21. By suitably rotating the knurled head 25, 26 the screw 81 will cause the plunger 82 to be raised in its cylinder 86 and allow the mercury to leave the glass capillary tube 22 and descend into the large bore metal connecting tube where, by reason of the larger bore (which should preferably be not less than 0.13 inches in diameter) bubbles of air may rise through the mercury and escape through the "open" end 84 of the gauge system. Meanwhile, since the plunger is always below the level of the mercury the space under the plunger becomes filled with mercury because the air is forced to pass through the plunger. Figure 1 shows the plunger in its raised position and the mercury level is indicated by the dotted lines.

It will be noticed that the screw 81 is slotted at 85 to enable a free passage of mercury from one side of the screw to the other.

Figure 2 shows an enlarged view of the "open" end of the glass tube. 88 is a wad of felt held against the open end of the glass tube by a perforated cap 87 so that air may pass freely through the felt but mercury is retained and dust excluded.

Before making each test the plunger 82 is raised to allow the escape of air through the mercury in the tube 21, as well as through the plunger, after which the same plunger is screwed down until the end of the column of gauge liquid is at zero on a graduated scale of any suitable type disposed along the tube 22.

As well as permitting air to escape, the felt plunger serves to exclude dust.

The felt plunger has the additional advantages that, being elastic, it does not have to be made a very accurate fit to the cylinder, and it can never seize like a metallic plunger. This is an important feature, as excess lubricant must be avoided as likely to cause trouble, and as most non-ferrous metals are liable to amalgamate with mercury they cannot be used.

As above indicated all openings from the gauge system to the atmosphere are covered by porous material such as will prevent the ingress of dust and the egress of mercury.

I claim:—

1. A mercury gauge comprising a main mercury chamber, a piston adapted to be moved in said main chamber in accordance with a movement to be measured, a tube of relatively large bore not appreciably less than one-eighth of an inch in diameter connected at one end to said main chamber, a transparent tube of relatively fine bore connected at one end to the other end of the first said tube and open at its other end to the atmosphere, a mercury chamber adjustable as to its volume connected to the main mercury chamber through an upper wall thereof, and having an outlet leading from its upper portion to the atmosphere and a porous piston located in the adjustable chamber above the mercury therein and between said mercury and the said outlet and below the normal level of the mercury in the fine bore tube and formed of material such as to permit passage of air but to preclude passage of mercury through the porous piston.

2. A mercury gauge comprising a main mercury chamber, a piston adapted to be moved in said main chamber in accordance with a movement to be measured, a tube of relatively large bore not appreciably less than one-eighth of an inch in diameter connected at one end to said main chamber, a transparent tube of relatively fine bore connected at one end to the other end of the first said tube and open at its other end to the atmosphere, a covering of porous material located across the open end of said transparent tube, a mercury chamber adjustable as to its volume connected to the main chamber through an upper wall thereof and having an outlet leading from its upper portion to the atmosphere and a porous piston located in the adjustable chamber above the mercury therein and between said mercury and the said outlet and below the normal level of the mercury in the fine bore tube and formed of material such as to permit passage of air but to preclude passage of mercury through the piston.

LESLIE HAYWOOD HOUNSFIELD.